Feb. 4, 1930. J. A. O'ROURKE 1,745,862
REAR VISION PERISCOPE
Filed Jan. 23, 1929

Witnesses

Inventor
John A. O'Rourke
By Edwin Hammels
Attorney

Patented Feb. 4, 1930

1,745,862

UNITED STATES PATENT OFFICE

JOHN A. O'ROURKE, OF DARBY, PENNSYLVANIA

REAR-VISION PERISCOPE

Application filed January 23, 1929. Serial No. 334,388.

This invention relates to rear vision devices for vehicles, and in particular for wide bodied commercial vehicles or trucks, in which the width of the body and the absence of a rear window make it difficult for the driver to observe traffic conditions at the rear of his vehicle.

The present invention has for one of its objects the arrangement of twin periscopes arranged conveniently to the driver's cab having objective mirrors or prisms projecting beyond the sides of the vehicle and directed rearwardly so as to embrace a view of what ever is at the rear of the vehicle on either side, said periscopes being provided with mirrors or prisms for the purpose of receiving the images from the objective elements and reflecting them to a direct vision mirror positioned in the field of vision of the driver.

Another object of the invention is to provide for the ventilation of the cab as well as for keeping the reflecting elements of the periscopes free from dust, by making the periscope tubes open to atmosphere, whereby the forward motion of the vehicle induces a draft through the tubes of the periscope.

Other objects of the invention will appear as the following description of a preferred embodiment thereof proceeds.

In the drawings, in which similar characters of reference are used to denote like or identical elements, Fig. 1 is a plan view of the body of a vehicle, partly in section, showing the twin periscopes arranged adjacent the back of the cab.

Figure 1:
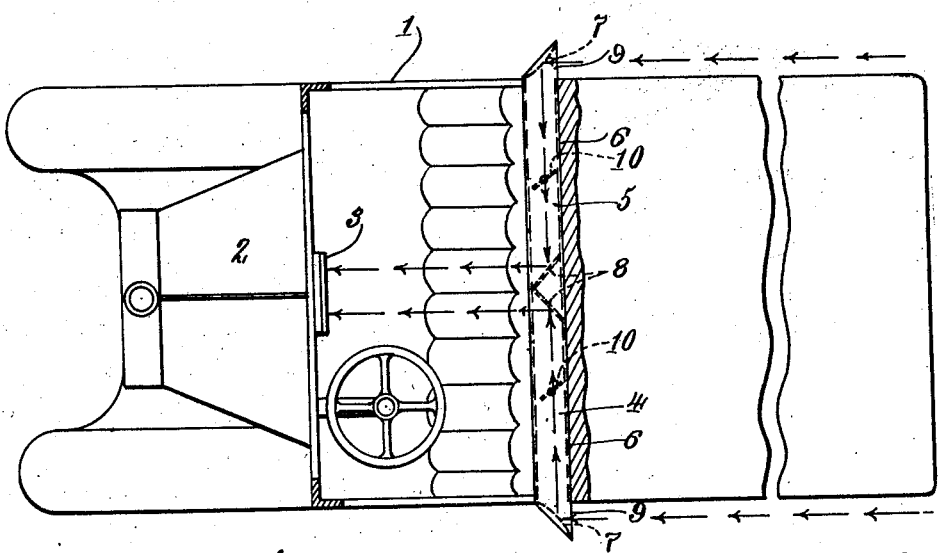
Figure 2:
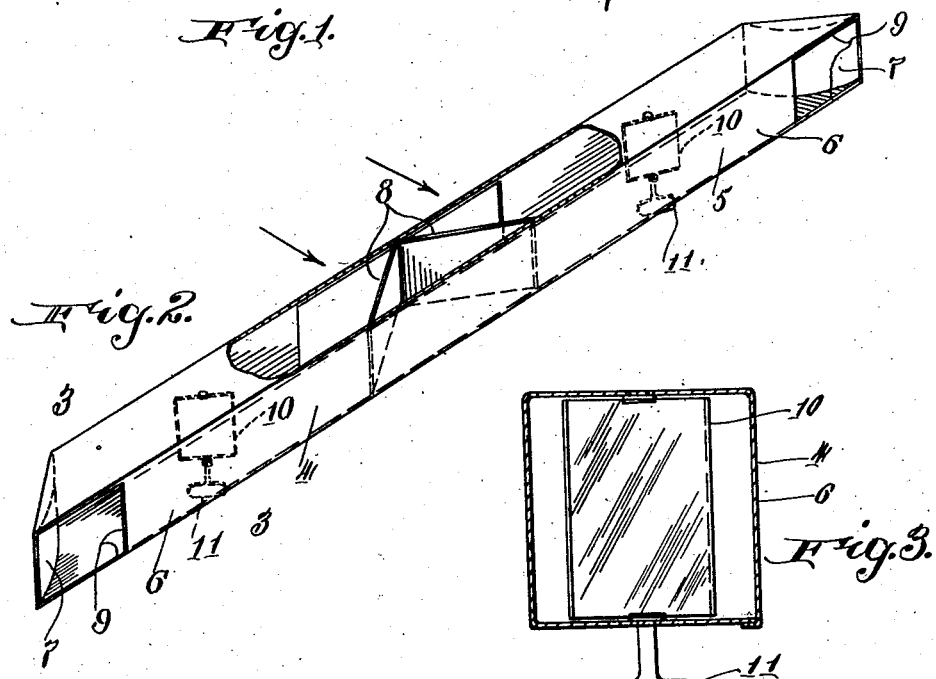
Fig. 2 is a perspective view of the periscopes.
Figure 3:
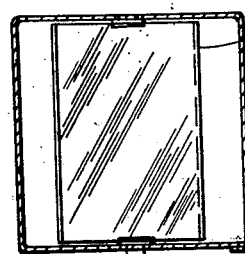
Fig. 3 is a section taken along the line 3—3 of Fig. 1.

Referring now in detail to the several figures, the numeral 1 represents the body of a vehicle, in this instance, exemplified as a motor truck, 2 being the cab or driver's compartment. It is assumed that the body is of such width that the driver cannot look around toward the rear of the vehicle without difficulty, neither can he use merely the direct vision mirror 3 on account of the lack of front and rear windows in the body of the cab.

This difficulty is overcome by providing in cooperation with the direct mirror 3, a pair of periscopes 4 and 5 preferably arranged adjacent the back of the cab, although the exact positioning of the periscopes is optional, and not vital to the invention. The periscopes each consist of a tube 6 which may be of any cross sectional shape each tube having an objective reflecting element 7 at its outer end. In the present instance these objective elements are convex mirrors, each extending beyond the sides of the body and being angularly disposed so as to command a view to the rear of the vehicle on the respective sides. The periscope tubes are preferably arranged in alinement and at their adjacent ends provided with angularly positioned reflecting surfaces such as the mirrors 8, so disposed as to receive the reflected images from the objective mirrors and to reflect them into the direct vision mirror. With this object in view, the tubes of the periscopes are cut away or discontinued adjacent the mirrors 8 on that side which faces the direct vision mirror 3.

It is apparent that upon looking into the direct vision mirror, the driver is enabled, by the present invention to simultaneously observe traffic or other conditions at both sides of the rear of the vehicle.

In order to prevent the settling of dust upon the mirrors 7 and 8 and consequent impairment of their efficiency, advantage is taken of the rearwardly inclined objective mirrors to produce a detergent current of air through the periscope tubes, thereby preventing the dust settling on the mirrors by keeping the air in motion, and removing such dust as may have collected on the mirrors during stationary periods of the vehicle. With this object in view, the periscope tubes are left open at the outer ends as indicated at 9, the inclined objective mirrors acting as ejectors in conjunction with the natural draft produced by the vehicle when in motion.

Not only has the air current through the periscopes a cleansing effect upon the periscope structure but it also accomplishes the ventilation of the cab.

In order to control the flow of air through the periscopes, dampers 10 are provided these being preferably pivotally arranged and each operated by a handle 11. The dampers are preferably made of a transparent substance so that they offer substantially no impediment to the passage of light through the periscopes.

While I have in the above description disclosed what I believe to be a preferred embodiment of my invention, it is to be understood that the specific details as shown and described are merely by way of example and not limitative of the scope of the invention.

What I desire to claim as my invention is:

1. A rear vision device for vehicles comprising a periscope including a reflector at one end extending beyond the side of the vehicle and directed so as to receive an image of objects at the rear of the vehicle, a mirror suitably positioned in the field of vision of the vehicle driver, and an intermediate reflecting element so disposed as to receive an image from the end reflector and to reflect it into said direct vision mirror, a tube in which said end reflector and intermediate reflecting element are enclosed, said tube having suitable openings to pass air through the tube providing for the ventilation of the cab and a transparent damper between said end reflector and intermediate reflecting element.

2. A rear vision device for vehicles comprising a periscope tube having an objective reflector at one end extending beyond the side of the vehicle and directed to receive an image from objects at the rear of the vehicle, a second reflector arranged in said tube so positioned as to receive the image reflected from said objective and a direct vision mirror, said second reflector being arranged to project the image into said direct vision mirror, said tube being open adjacent said objective and said reflecting surface to provide for the passage of air through said tube and into contact with said objective and said reflecting surface and a transparent damper in said tube controlling the flow of air therethrough.

Signed by me at Darby, Pennsylvania, this 19th day of Jan., 1929.

JOHN A. O'ROURKE.